United States Patent
Singh et al.

[11] Patent Number: 5,510,929
[45] Date of Patent: Apr. 23, 1996

[54] SOLID SOLUTION CRYSTALS OF $TL_3ASSE_3$ AND $TL_3ASS_3$ FOR HIGH EFFICIENCY OPTICAL APPLICATIONS

[75] Inventors: Narsingh B. Singh, Export; Tom Henningsen, Monroeville; James P. McHugh, Wilkins Township, Allegheny County; Emmanuel P. Supertzi, Pittsburgh; Richard P. Storrick, East McKeesport; Robert Mazelsky, Monroeville, all of Pa.

[73] Assignee: Westinghouse Electric Corporation, Pittsburgh, Pa.

[21] Appl. No.: 165,290

[22] Filed: Dec. 13, 1993

[51] Int. Cl.[6] .................................................. G02F 1/00
[52] U.S. Cl. .................................................. 359/322
[58] Field of Search .................................... 359/322

[56] References Cited

U.S. PATENT DOCUMENTS

| | | | |
|---|---|---|---|
| 3,733,499 | 5/1973 | Deis et al. | 310/4 |
| 3,792,287 | 2/1974 | Roland et al. | 307/88.3 |
| 3,799,659 | 3/1974 | Roland et al. | 350/321 |
| 3,915,556 | 11/1975 | Roland et al. | 350/161 |
| 3,958,863 | 5/1976 | Isaacs et al. | 350/161 |
| 4,955,699 | 9/1990 | Singh et al. | 350/353 |

OTHER PUBLICATIONS

Singh, N. B., et al. "Growth And Characterization Of Thallium Arsenic Selenide Crystals For Nonlinear Optical Applications", *Progressive Crystal Growth and Characteristics*, vol. 20, pp. 175–188, 1990.

Feichtner, J. D. and Roland, G. W., "Optical Properties of a New Nonlinear Optical Material: $Tl_3AsSe_3$", *Applied Optics*, vol. 11, No. 5, May, 1972.

Primary Examiner—Georgia Y. Epps
Assistant Examiner—Thomas Robbins

[57] ABSTRACT

Crystals formed of a solid-solution of $Tl_3AsSe_3$ and $Tl_1AsS_3$ provide very good materials for the nonlinear optical conversion efficiency. The crystals are useful in nonlinear optical devices such as harmonic generators and optical parametric oscillators, and in linear applications such as acousto-optical devices. The method of preparing such crystals is also disclosed.

20 Claims, 4 Drawing Sheets

SOLID SOLUTION CRYSTALS OF TL$_3$ASSE$_3$ AND TL$_3$ASS$_3$ FOR HIGH EFFICIENCY OPTICAL APPLICATIONS

BACKGROUND OF THE INVENTION

The invention relates to crystals having optical properties suitable for use in optical applications, such as harmonic generators, optical parametric oscillators and acousto-optical devices.

When light enters a linear crystal its electric field generates a polarization in the crystal by displacing positive charges in one direction and negative charges in the opposite direction. The bound charges follow the applied field, accelerating and moving in synchronism with it, and thus reradiate a light ray similar in direction and frequency to the incident ray.

In linear optical crystals the displacement of the charges is the same for the two opposing directions of the field, but in nonlinear optical crystals, as a result of the crystal structure, the displacement is greater for a field in one direction than in the opposite direction. As a result of the asymmetric motion, the bound charges in nonlinear crystals generate a reradiated wave which is not identical to the driving wave in that it contains small admixtures of higher harmonics of the incident wave, the second harmonic being of particular interest. The efficiency of conversion of the second harmonic depends on the magnitude of the nonlinear optical susceptibility, which is related to the crystal composition and structure, and on the volume of the crystal which is effective in acting as a coherent generator of the second harmonic wave.

In the simplest case, the volume is limited to the fact that due by normal dispersion of the refractive indices of the material, the second harmonic ray propagates more slowly through the crystal than does the fundamental ray. As a result, at a given point in the crystal the harmonic ray derived from the fundamental in say, the first part of the crystal may be out of phase with that derived from the fundamental in a succeeding part of the crystal, resulting in destructive interference of the generated second harmonic wave, and severe limiting of the effective volume for coherent generation of the second harmonic.

In birefringent nonlinear crystals, however, the problem can be overcome by taking advantage of the fact that in such a crystal, there are different effective light propagation velocities, depending on the polarization of the beam and its propagation direction in the crystal. As an example, in a uniaxial negative birefringent crystal an extraordinary ray travels at a faster speed than does the ordinary ray (i.e., one which is polarized with its E-vector perpendicular to the crystal c-axis.) The difference in speeds increases as the direction of propagation of the extraordinary ray is shifted away from the c-axis and is at a maximum when the extraordinary ray propagation direction is normal to the c-axis. Making use of this fact, one can increase the speed of the extraordinary second harmonic ray by increasing its angle of propagation to the c-axis until at some angle, known as the "phase- matching angle", j, its speed will equal the speed of the fundamental ray propagating as an ordinary ray. Then the contributions to the second harmonic ray from the fundamental radiation in all parts of the fundamental ray will be in phase, and the second harmonic ray output and the conversion efficiency will be optimized.

There is a great need for an efficient infrared light source that can operate in the mid-infrared wavelength region. Because there are no efficient light sources in the range from 3 to 5 μm, the most practical way to accomplish this goal is to use nonlinear crystals to downshift (using optical parametric oscillation) the output of lasers operating at 1 or 2 μm, or upshift (using second harmonic and higher harmonic generation) the output of the $CO_2$ laser at 10 μm. The main obstacle to more widespread use of optical parametric oscillation has been the difficulty in growing large, high quality nonlinear crystals with a combination of high nonlinear coefficients, optical transmission, and optical and mechanical parameters compatible with high average power operation. The ideal requirements for nonlinear optical materials are very difficult to meet in a single material. Optical homogeneity, laser damage threshold, stability of the compound upon exposure to a laser beam, and ease of fabrication are main concerns. Improved mechanical properties with respect to cutting and polishing will contribute to increasing the surface damage threshold. Another concern for crystal growers is to scale up the crystal size to achieve high efficiency and high power output without sacrificing the optical quality. The present invention provides excellent materials to implement this technology.

In U.S. Pat. No. 3,792,287 Roland and Feichtner disclose a compound of the formula $Tl_3AsSe_3$ made into large optically useful crystals which are birefringement and display nonlinear optical properties in the infrared. They teach that such a crystal can be used in a harmonic generator, an optical parametric oscillator and an optical frequency upconverter. The performance of such a crystal for frequency conversion requires good optical quality, polishing characteristics and mechanical properties. However, the $Tl_3AsSe_3$ crystal is relatively soft and has been difficult to polish and handle.

Roland et al. disclose a crystal of $Tl_3AsS_4$ for use in acousto-optical systems in U.S. Pat. No. 3,915,556. This crystal is not a nonlinear crystal and is not suitable for converting light in the mid-infrared light region.

Thallium arsenic selenide single crystals were grown in our laboratory and characterized. These prior art crystals perform well, but improvements in the mechanical characteristics and increase in laser damage threshold will enhance its applications. The present invention fulfills this need.

SUMMARY OF THE INVENTION

We have found that a solid solution of $Tl_3AsSe_3$ and $Tl_3AsS_3$ can be grown in large optically useful crystals. These crystals have very good nonlinear optical efficiency, higher damage threshold, good mechanical characteristics and mechanical fabricability. These crystals are useful nonlinear harmonic generators and optical parametric oscillators. They can be used with lasers for wavelength conversion within the 0.9 to 10 micrometer region. In addition, they are also suitable for use in linear optical applications, such as in acousto-optical devices.

This invention also encompasses methods of making such solid solution crystals and using such crystals in both linear and nonlinear optical devices.

DESCRIPTION OF THE PREFERRED EMBODIMENTS

Figure 1:
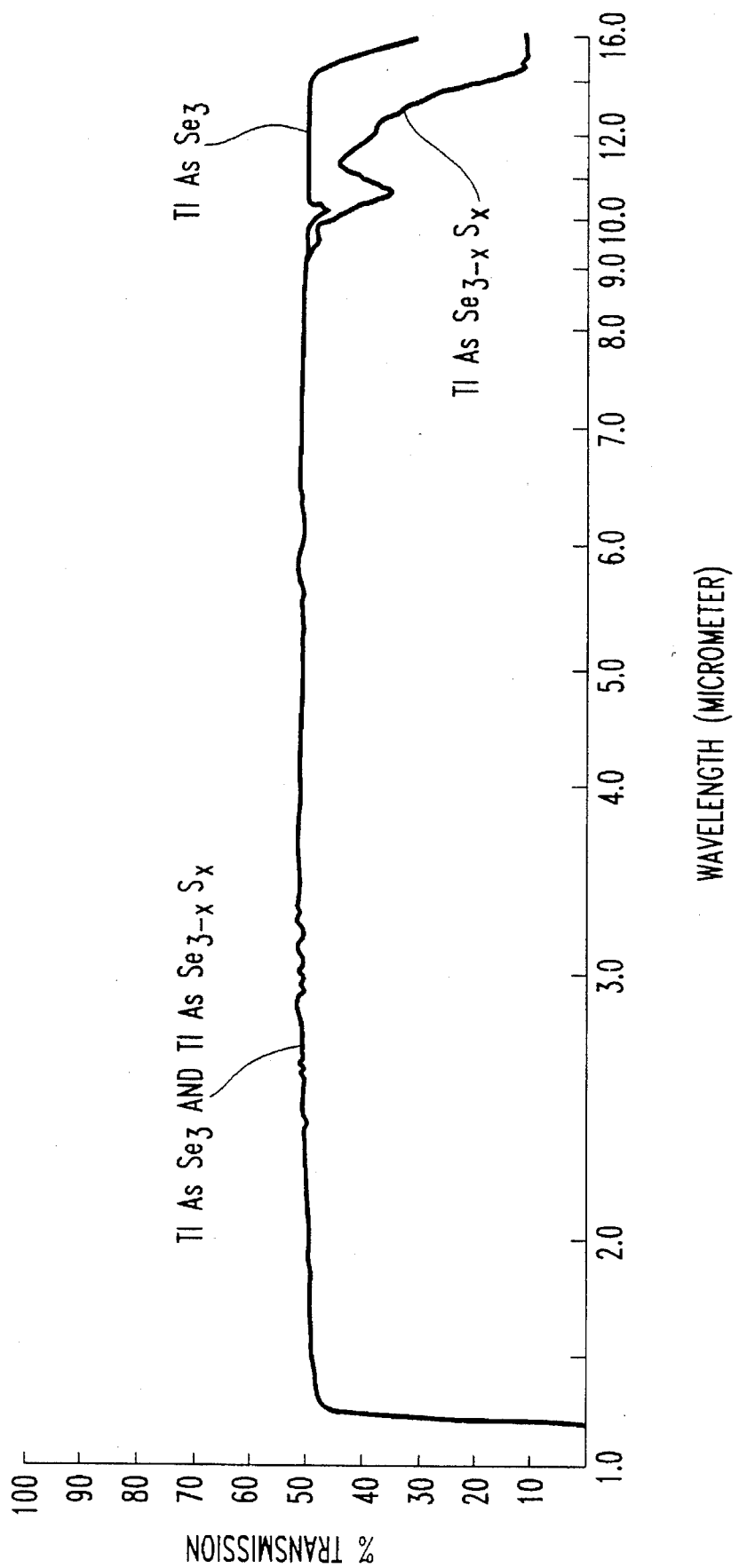
FIG. 1 is a graph of the transmission of pure $Tl_3AsSe_3$ (TAS) and of modified TAS where some of the Se has been replaced by S.

The harmonic conversion efficiency e in the presence of depletion of a pump beam such as a laser beam is given as:

$$e = [\{2m_o^{3/2} \, e_o^{1/2} (w^2/n^3) d^2 L^2 I\}^{1/2}] \quad (1)$$

where L is the crystal length, I is the pump intensity, d is effective nonlinear coefficient, and n is the refractive index. Equation (1) is valid as long as losses caused by the conversion process itself can be ignored. Thus, the conversion efficiency is proportional to the pump intensity. However, because of the limitation of radiation power damage and conversion efficiency which the crystal can deliver, it is necessary to grow greater lengths of crystals to achieve higher power levels.

For an optical parametric oscillation system, the gain G is given by the equation:

$$G = \frac{8\pi c^2 \cdot IdL^2 \cdot 377^3 \cdot L^2 \cdot P}{\lambda_s \lambda_i \cdot n^3 \cdot A} \quad (2)$$

where $\lambda_i$ and $\lambda_s$ are idler and signal wavelength, c is the speed of light, $377^3$ comes from the impedance factor and P/A is power factor per unit area (P is the power and depends on damage threshold, A is the area). The biggest challenge is to grow a large crystal with a large nonlinear coefficient, good homogeneity, high laser damage threshold and good mechanical fabricability. We provide a crystal formed of $Tl_3AsSe_3$—$Tl_3AsS_3$ solid solution to enhance the nonlinear optical efficiency and laser damage threshold. The nonlinear optical susceptibilities in $Tl_3AsSe_3$ and $Tl_3AsS_3$ result from lack of symmetry in the crystals. When we mix these compounds, the lattices are distorted which further enhances the susceptibilities and hence the nonlinearity. This invention provides a novel approach and novel class of very efficient crystals suitable for the second, third and higher order frequency conversion and optical parametric oscillators, as well as for acousto-optic applications.

THE CRYSTAL

Solid solution crystals were prepared by mixing stoichiometric compositions of thallium arsenic selenide ($Tl_3AsSe_3$) and thallium arsenic sulfide ($Tl_3AsS_3$). Homogeneous mixing of charges were ensured by raising the temperature to a temperature in the range from about 750° C. to about 800° C. during the reaction. After the reaction was completed charges were directionally solidified at the speed of 2.5 cm/day at a gradient of 50° to 60° K/cm. The first and last part of directionally solidified ingot was rejected in order to eliminate the impurities segregated due to distribution coefficients less than or higher than unity. The crystals were grown in a sealed quartz tube by the Bridgman-Stockbarger method from the melt. X-ray powder diffraction studies showed that the crystal belongs to the rhombohedral class. The crystal was grown in an orientation which was 19° off from the c-axis, the phase matching orientation needed for second harmonic generation testing. The crystal was in the form of a rhombohedral crystal, and its size was 2.5 cm in diameter and 7 cm long.

The following example further illustrates this invention. Thallium, arsenic and selenium were weighed to prepare $Tl_3AsSe_3$ and thallium, arsenic and sulfur were weighed to prepare $Tl_3AsS_3$ in stoichiometric ratio. The actual amount for the $Tl_3AsS_3$ amount was Tl=408.5 g, As=49.92 g and S=64.09 g. Similarly a total of 268.03 g $Tl_3AsSe_3$ was weighed. The elements were sealed in vacuum in a quartz tube. The tube was heated to melt the parent components and ensure the complete mixing of elements. After complete mixing, both $Tl_3AsSe_3$ and $Tl_3AsS_3$ compounds were directionally solidified for further purification. After purification one charge of $Tl_3AsSe_{2.9}S_{0.1}$ was prepared by mixing pure $Tl_3AsSe_3$ and $Tl_3AsS_3$. These charges were used to grow single crystals in two 25 mm diameter quartz tube by Bridgman technique. We used $Tl_3AsS_3$ seed oriented 19° off from the C-axis direction (an orientation needed for nonlinear optical application) to achieve the single crystal. The thermal gradient was approximately 20° K/cm and growth rate was 1 cm/day. After crystal growth, the crystals were taken out of tube and cut by string saw for testing. The crystals were polished and fabricated for laser testing. Although the ratio of Se to S in this example is 2.9:0.1, it should be understood that this invention encompasses solid solution crystals of the formula $TlAsSe_{3-x}S_x$, where x can be any number ranging from about 0.05 to about 2.95.

The conical section generated during growth as the growing crystal expands from the seed to the 25 mm boule diameter is not desirable for testing and was cut from the crystal. The other end of the boule was the last part to solidify and was eliminated from the crystal. We prefer to use crystals of at least 10 mm in diameter. High quality optical polishing was achieved by using 0.1 micrometer size diamond particles.

Our crystals have much better cutting and polishing characteristics than $Tl_3AsSe_3$ crystals. Crystal chipping and pullouts were observed in $Tl_3AsSe_3$ when optical polishing was attempted by 0.1 μm size diamond particles. The scratches were very common and it was extremely difficult to remove the scratches from the optically polished surfaces. In contrast, the crystals of this invention have much improved polishing behavior.

To test the crystals, a Lumonix Model 203 TEA $CO_2$ laser was tuned to the $CO_2$ band at 9.586 μm. A single transverse mode was obtained by use of a 16 mm aperture in the laser cavity. Single or low order longitudinal modes could be obtained using an intracavity low pressure gain cell. The Brewster angle windows on the gain cell ensured the vertical polarization under all operating conditions. The spatial pulse was primarily a Gaussian type. The temporal pulse shape of the laser consisted of an 80 ns gain switched pulse followed by a 300 ns "nitrogen tail" that contained 50% of the energy, but because of the low intensity, contributed almost nothing to SHG conversion. The profile was measured with a pyroelectric detector with a 20 ns response time. The surface was irradiated by increasing the energy of the laser system gradually. The crystals performed satisfactorily.

The second harmonic efficiency was measured at the 9.6 μm and 9.2 μm wavelengths. The spot size used in the study was 5 mm. We operated up to 6.8 Joule/cm². We observed that the damage threshold was above 4 Joules/cm². This value is significantly higher than reported value of 1.7 Joules/cm² for $Tl_3AsSe_3$. This is a significant improvement in damage threshold. The nonlinear coefficient for our solid-solution is about the same as the quoted value for $Tl_3AsSe_3$.

FIG. 1 shows the optical transmission of pure $Tl_3AsSe_3$ (TAS) and of modified TAS where some of the Se has been replaced by S. The effect of the transmission is the introduction of increased absorption in the 9 to 17 μm range. This is of no significance for applications that make use of the 1.3 to 9 μm range., such as harmonic generators, mixers and optical parametric oscillators for the mid-infrared range of 3 to 5 μm. The significant advantage of this invention is its improved hardness and fabrication characteristics, which make the material easier to cut and polish and more durable in use.

HARMONIC GENERATOR

In a harmonic generator a beam of coherent light of a fundamental wavelength is directed at the crystal at the phase-matching angle for the generation of the desired harmonic. The phase-matching angle will depend upon the wavelength of the fundamental, but may be easily determined experimentally by orienting the crystal until the harmonic is detected. Since conversion efficiency is proportional to power density, the fundamental is preferably focused near the center of the crystal to maximize conversion efficiency and since usually the ordinary polarization of the fundamental generates the harmonic, the fundamental is preferably an ordinary ray. As with all optical devices the input and output rays must be within the transparency region of the crystal.

Figure 2:
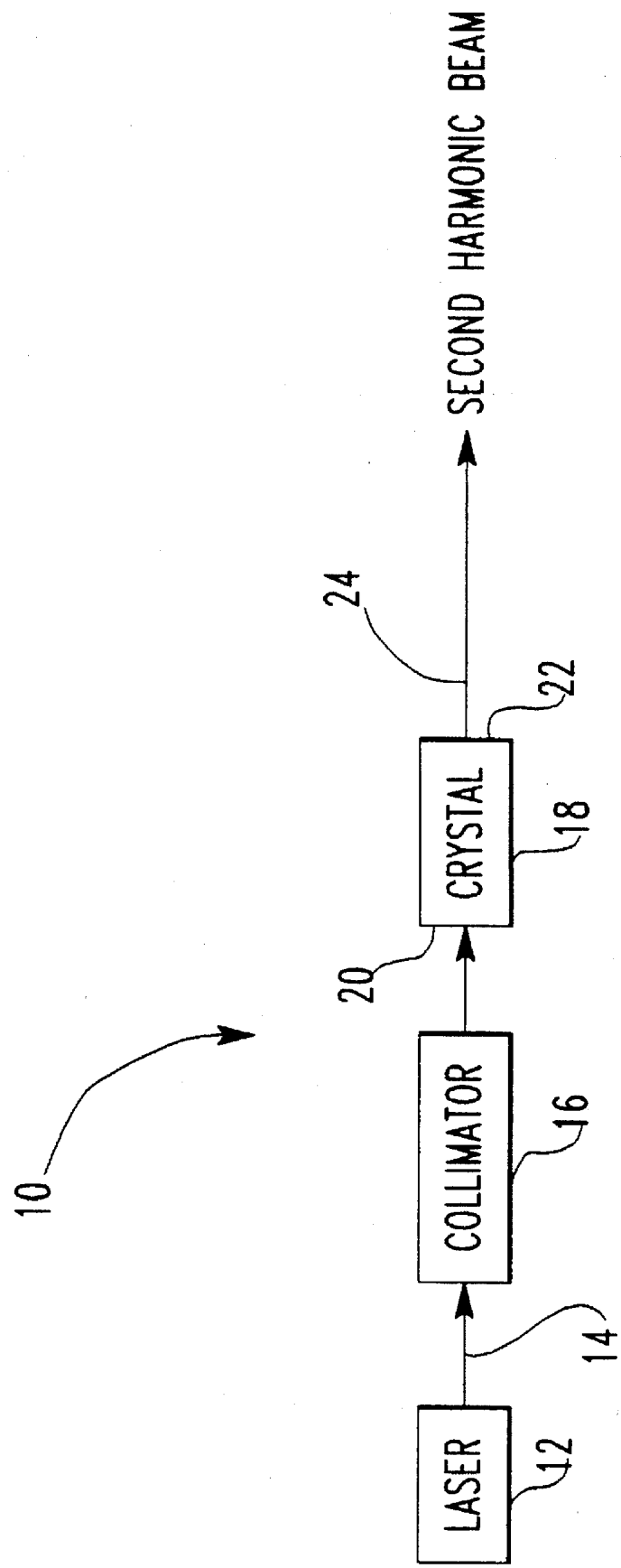
FIG. 2 is a diagram for a second harmonic generator using crystals of the present invention.

FIG. 2 illustrates an example of one application showing a harmonic generator 10. A laser 12 generates a coherent beam of light 14 at the fundamental wavelength which is focused by collimator 16 at the center of crystal 18 which has two polished faces 20 and 22. The beam 14 is normal to face 20 which is cut with its normal at the phase-matched angle j to the c-axis of the crystal. A second harmonic beam 24 leaves face 22 with the fundamental ray. Additional lenses and reflectors (not shown) can be provided to direct this beam to a desired location.

OPTICAL PARAMETRIC OSCILLATOR

While the only quantitative output of a harmonic generator is the harmonic wavelengths, an optical parametric oscillator can theoretically generate any frequency lower than the fundamental (within the transparent region of the crystal). In one version of an optical parametric oscillator a coherent extraordinary fundamental ray generates a coherent ordinary signal ray and a coherent ordinary idler ray, the sum of the frequencies of the signal and idler rays equaling the frequency of the fundamental ray. Either of the two output rays may be designated as the "signal" ray for the purposes of this invention. All three rays must be within the transparency region of the crystal. The fundamental ray is preferably an extraordinary ray and is preferably focused at the center of the crystal to maximize conversion efficiency. The angle of the fundamental ray in the crystal to the c-axis (the "phase- matching angle") determines the wavelength of the signal and idler rays.

Figure 3:
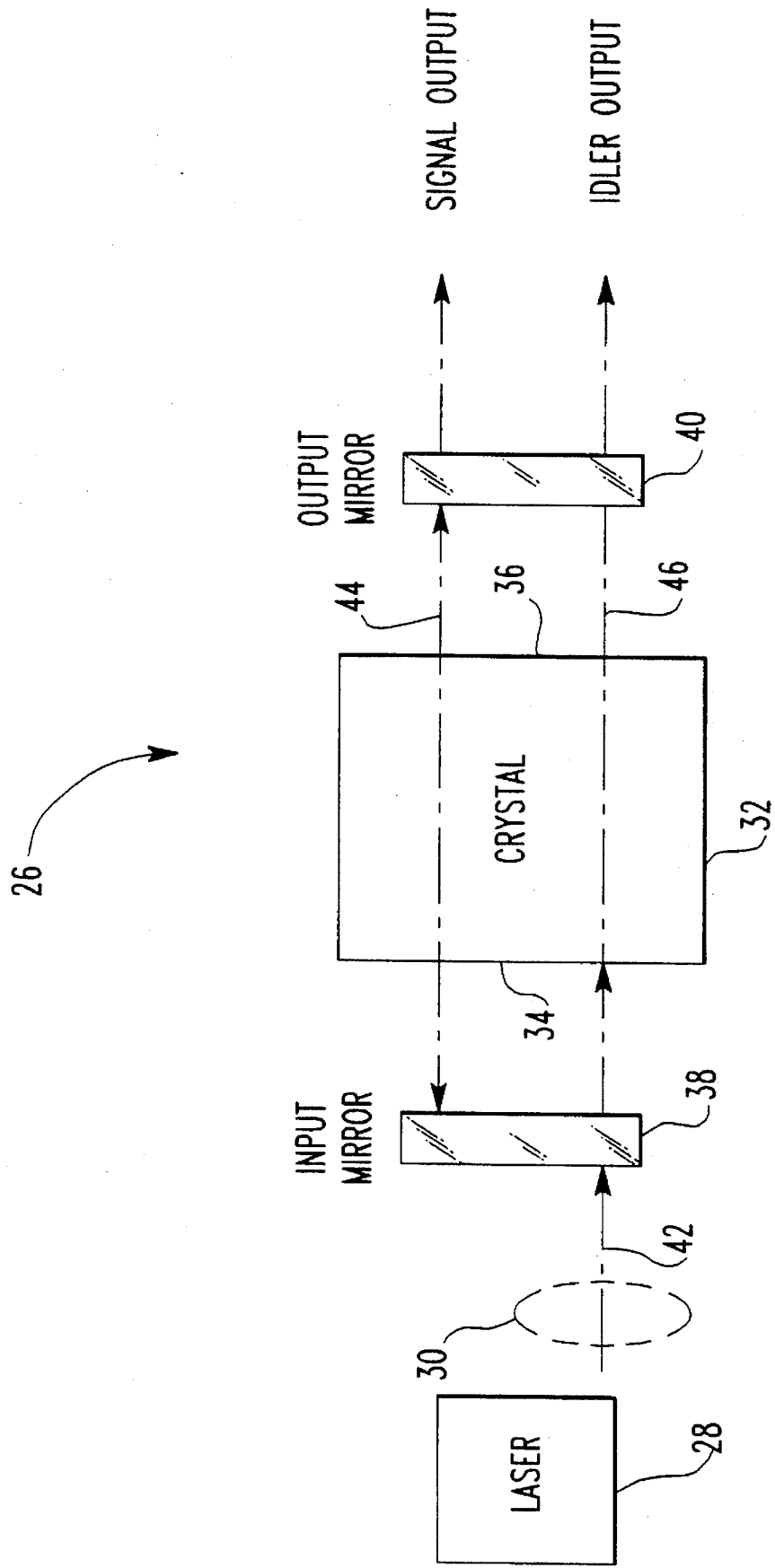
FIG. 3 is a diagram showing an optical parametric system using crystals of the present invention.

FIG. 3 illustrates an optical parametric oscillator 26 in an external configuration according to this invention. A laser 28 generates a fundamental ray which is focused by an optional lens 30 into the center of crystal 32 having polished faces 34 and 36. Opposite the ends of crystal 32 are mirrors 38 and 40, the common optical axis of which is parallel to the fundamental ray in the crystal. These mirrors may be deposited directly on the crystal but this is not preferred. As indicated by arrow 42 a laser 28 inputs a beam through input mirror 38 to produce a signal output 44 and idler output 46.

ACOUSTO-OPTICAL APPLICATIONS

The solid solution crystals of this invention can also be used in a variety of acousto-optical devices such as those described in U.S. Pat. Nos. 3,799,659; 3,915,556; and 3,958,863, which are hereby incorporated by reference. Those patents describe display devices, laser modulators, tunable filters and acoustic delay lines.

Figure 4:
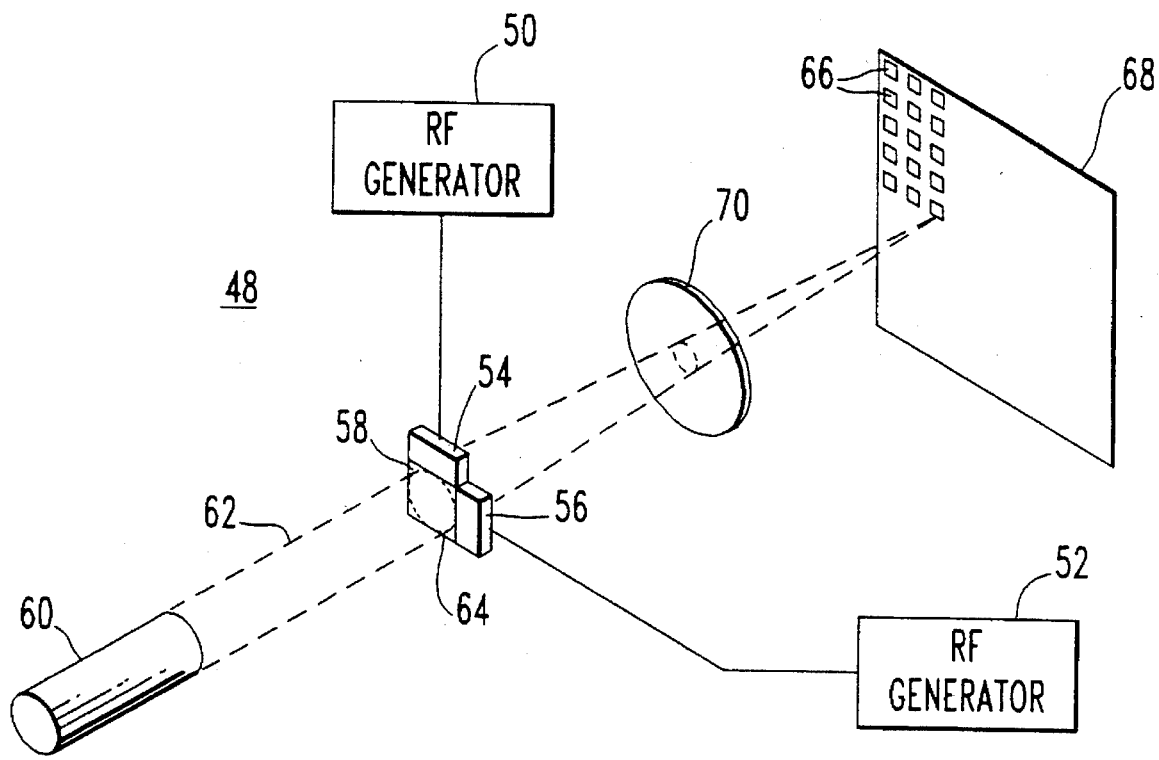
FIG. 4 is an isometric diagrammatic drawing of a display device using the crystals of this invention.

FIG. 4 is an isometric diagrammatic drawing of a display device 48 using the crystals of this invention. Radio frequency generators 50 and 52 send RF signals to transducers 54 and 56 respectively, which respectively generate vertically moving and horizontally moving sound waves in the solid solution crystal 58, preferably in the Bragg mode so that there is only one diffraction beam. The light, which is preferably collimated, is obtained from a laser 60 which generates a coherent beam of light 62 having a wavelength in the range of about 1.3 to 17 μm and being directed at one of two parallel optical faces 64 of crystal 58. Light passing through crystal 58 is directed at various spots 66 on viewing screen 68 by means of vertically and horizontally moving sound waves generated by transducers 54 and 56. Lens 70 focuses the light at the spots.

The illuminated spots may each be a page of information which is then optically enlarged and projected on a second viewing screen (not shown). The illuminated spots could also in themselves form a pattern. In either case, visible or infrared light could be used. In the infrared case, for example, viewing screen 68 could be a phosphor coated screen such as zinc sulfide doped with lead and copper and flooded with UV light and the successive illumination of selected spots would form a picture similar to a television picture. Also, in the infrared, viewing screen could be an infrared or thermally quenched UV-excited phosphor screen where ultraviolet light causes the entire screen to be illuminated, but each selected spot successively struck by the beam from crystal 58 is darkened to form a picture on the screen.

Figure 5:
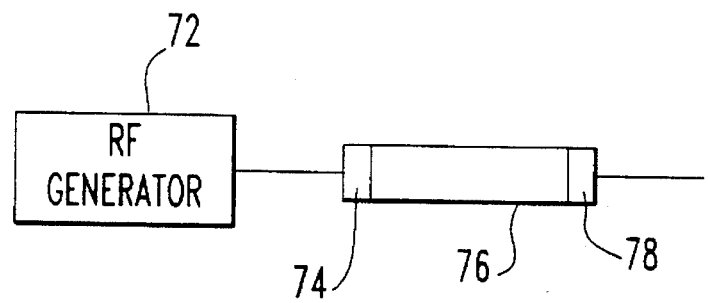
FIG. 5 is a diagrammatic drawing of an acoustic delay line using the crystals of this invention.

This invention also encompasses an acoustic delay line which causes an electrical signal to be delayed for a length of time required for an acoustic signal to traverse the crystal. Unlike many other methods of delaying an electrical signal, an acoustic delay line is non-dispersive. FIG. 5 is a diagrammatic drawing of an acoustic delay line using the crystals of this invention. In FIG. 5, RF generator 72 provides the electrical signal to be delayed. This signal is electrically transmitted to transducer 74 which converts the signal to an acoustic wave which is propagated through the solid solution crystal 76. At the other end of the crystal, transducer 78 detects the acoustic wave and converts it into an electrical signal.

Although we have described and illustrated certain preferred embodiments of our invention, it should be understood that the invention is not limited thereto but may be variously embodied within the scope of the following claims.

We claim:

1. A solid-solution crystal comprised of $Tl_3AsSe_3$ and $Tl_3AsS_3$.

2. The crystal of claim 1, having a formula of $Tl_3AsSe_{3-x}S_x$ wherein x is between about 0.05 and about 2.95.

3. The crystal of claim 2, wherein x is 0.1.

4. The crystal of claim 1, wherein said crystal is rhombohedral.

5. An optical nonlinear device comprised of:
   a. a crystal comprised of a solid solution of both $Tl_3AsSe_3$ and $Tl_3AsS_3$;

b. means for generating a fundamental ray of coherent light; and c. means for directing the fundamental ray of coherent light at one of the polished faces of the crystal at an angle to c-axis of the crystal at which the ray and the harmonic are phase matched.

6. The optical nonlinear device of claim 5, wherein said crystal has a formula of $Tl_3AsSe_{3-x}S_x$, and wherein x is between about 0.05 and about 2.95.

7. The optical nonlinear device of claim 6, wherein x is 0.1.

8. The optical nonlinear device of claim 5, wherein said crystal is rhombohedral.

9. An optical parametric oscillator for generating a signal ray and an idler ray from a fundamental ray comprising:

a. a crystal comprised of a solid solution of $Tl_3AsSe_3$ and $Tl_3AsS_3$;

b. means for generating a fundamental ray of coherent light;

c. means for directing the fundamental ray at one of the polished faces of the crystal; and d. two parallel opposing mirrors M1 and M2, an optical axis of which is parallel to the fundamental ray within the crystal, M1 positioned between the means for generating the fundamental ray and the crystal and being transparent to the fundamental ray and M2 being positioned at the opposite end of the crystal, one of the mirrors being reflective at the wavelength of the signal ray and the other mirror being partially reflective at the wavelength of the signal ray.

10. The optical parametric oscillator of claim 9, wherein the crystal has a formula of $Tl_3AsSe_{3-x}S_x$, and wherein x is between about 0.05 and about 2.95.

11. The optical parametric oscillator of claim 10, wherein x is about 0.1.

12. The optical parametric oscillator of claim 9, wherein said crystal is rhombohedral.

13. A method of preparing a crystal having nonlinear optical properties, said method comprising the steps of:

mixing stoichiometric compositions of $Tl_3AsSe_3$ and $Tl_3AsS_3$ to form a first mixture;

heating said first mixture to ensure homogeneous mixing;

directionally solidifying an ingot from said first mixture within a temperature gradient.

14. A method of preparing a crystal having nonlinear optical properties, according to claim 13, wherein during said heating step said first mixture is heated to a temperature in a range from about 750° C. to about 800° C.

15. A method of preparing a crystal having nonlinear optical properties, according to claim 13, wherein said ingot is solidified at a speed of about 1.0 cm/day.

16. A method of modulating light having a wavelength of about 1.3 to 17 μm comprising:

generating a sound wave in a solid-solution crystal comprised of $Tl_3AsSe_3$ and $Tl_3AsS_3$ having at least one pair of parallel optical faces, and directing light through said faces.

17. An acousto-optical system comprising:

a solid-solution crystal comprised of $Tl_3AsSe_3$ and $Tl_3AsS_3$ having at least one pair of optical faces;

means for generating a sound wave in said crystal;

a source of light having a wavelength of about 0.6 to 9.6 μm directed through said faces; and means for detecting at least a portion of said light after it passes through said crystal.

18. The acousto-optical system of claim 17, wherein said crystal has a formula of $Tl_3AsSe_{3-x}S_x$, and wherein x is between about 0.05 and about 2.95.

19. An acoustic delay line comprising:

a solid-solution crystal comprised of $Tl_3AsSe_3$ and $Tl_3AsS_3$;

means for generating sound waves in said crystal; and means for detecting sound waves after they have traversed said crystal.

20. The acoustic delay line of claim 19, wherein said crystal has a formula of $Tl_3AsSe_{3-x}S_x$, and wherein x is between about 0.05 and about 2.95.

* * * * *